United States Patent [19]

Kawana et al.

[11] Patent Number: 4,869,920
[45] Date of Patent: Sep. 26, 1989

[54] PROCESS FOR PREPARING SURIMI PRODUCTS

[76] Inventors: Frank S. Kawana, 425 S. San Rafael, Pasadena, Calif. 91105; Teisuke Suzuki, 16175 E. Castile Dr., Whittier, Calif. 90603; Minoru Okada, 4-13-16 Mejiro, Toshimaku, Japan

[21] Appl. No.: 214,411

[22] Filed: Jul. 1, 1988

[51] Int. Cl.⁴ .............................................. A23L 1/325
[52] U.S. Cl. .................................... 426/643; 426/647
[58] Field of Search ............... 426/643, 524, 647, 652, 426/657

[56] References Cited

U.S. PATENT DOCUMENTS

| | | |
|---|---|---|
| 3,093,483 | 6/1963 | Ishler . |
| 3,627,536 | 12/1971 | Arima et al. . |
| 3,829,587 | 8/1974 | Tolstoguzov et al. ............... 426/350 |
| 3,870,808 | 3/1975 | Boyer et al. ..................... 426/524 X |
| 3,891,776 | 6/1975 | Carpenter et al. .................. 426/573 |
| 3,904,776 | 9/1975 | Magnino et al. ............... 426/643 X |
| 4,275,084 | 6/1981 | Ohyabu et al. ................. 426/657 X |
| 4,362,752 | 12/1982 | Sugino et al. ...................... 426/104 |
| 4,402,987 | 9/1983 | von Lersner .................. 426/652 X |
| 4,423,083 | 12/1983 | Shenouda ............................ 426/574 |
| 4,464,404 | 8/1984 | Ueno et al. ................... 426/643 X |
| 4,548,823 | 10/1985 | Morimoto ........................... 426/104 |
| 4,554,166 | 11/1985 | Morimoto ........................... 426/276 |
| 4,557,940 | 12/1985 | Suzuki ................................ 426/513 |
| 4,559,236 | 12/1985 | Okada ................................ 426/643 |
| 4,579,741 | 4/1986 | Hanson et al. ....................... 426/92 |
| 4,584,204 | 4/1986 | Nishimura et al. ................. 426/643 |
| 4,622,234 | 11/1986 | Okada ................................ 426/643 |
| 4,720,391 | 1/1988 | Kawana ............................. 426/250 |
| 4,759,933 | 7/1988 | Uchida et al. ................. 426/643 X |

FOREIGN PATENT DOCUMENTS

| | | |
|---|---|---|
| 495353 | 1/1976 | Australia ............................ 426/574 |
| 58-56661 | 4/1983 | Japan . |
| 58-98061 | 5/1983 | Japan . |
| 58-111661 | 7/1983 | Japan . |
| 30392 | 7/1984 | Japan ................................. 426/643 |
| 146568 | 8/1984 | Japan ................................. 426/643 |
| 59-151865 | 8/1984 | Japan . |
| 12269 | 1/1988 | Japan ................................. 426/643 |

OTHER PUBLICATIONS

Masuda, Japanese Patent Abstract 58-20143, 4-15-83.

Primary Examiner—Arthur L. Corbin
Attorney, Agent, or Firm—William W. Haefliger

[57] ABSTRACT

During preparation of frozen surimi and surimi based products from fish infected with myxosporidian parasites, dried blood plasma or slightly hydrolyzed blood plasma and edible oil are added to fish meat to improve gel forming capacity and whiteness, and to reduce odor of frozen surimi and surimi based fish products.

10 Claims, No Drawings

PROCESS FOR PREPARING SURIMI PRODUCTS

BACKGROUND OF THE INVENTION

This invention relates generally to treatment of surimi, and particularly to a process to impart gel characteristics to surimi. There is a considerable interest in the possible utilization of fish infected with myxosporidian parasites such as Pacific whiting, Merluccius products, and Peruvian hake, Merluccius gayi, as a raw material for frozen surimi and surimi based products. These hakes are commonly found to be infected with myxosporidian parasites. The parasite myxosporidian is killed during the cooking process, but as this infection leads to protease-induced textural changes in cooked hake products, and to lowered surimi gel forming capacity, utilization of these hake for frozen surimi and surimi based products has been inhibited.

In order to improve the poor gel forming capacity of the infected hake, many attempts to apply protease inhibitors have been carried out. In the first step of frozen surimi manufacture, minced fish (mechanically separated fish meat) is washed with cold water, repeatedly. After being dewatered, the washed meat is mixed with cryoprotectants such as sugars and polyphosphates, and frozen. Surimi bases products are prepared by cooking surimi batter prepared from frozen surimi or the washed meat, ground with salt and other ingredients. According to the study of H. Groninger and his colleagues (Proceeding of International Symposium on Engineered Sea foods including Surimi, P. 199, National Fisheries Institute, 1985), a significant amount of protease remained in a Pacific whiting surimi sample prepared by the traditional method. Such trials involving washing treatment of minced meat with water containing protease inhibitors were not successful.

Early studies showed that the direct addition of more than 3% dried egg white, together with oxidants such as 500 ppm potassium bromate, to the washed meat was effective in improving the poor gel forming capacity of the infected hake. However, dried egg white alone is not sufficient to prepare a frozen surimi with high functionality. Also, the application of potassium bromate, the most effective oxidant, to frozen surimi and surimi based products is not permitted according to the Food Hygenetic Laws in Japan as well as in other countries. Therefore, in order to prepare frozen surimi and surimi based products with high functionality from myxosporidian infected fish, development of new ingredients having protease inhibiting activity is required.

SUMMARY OF THE INVENTION

According to the present invention the addition of blood plasma, especially dried plasma, to the washed fish meat is found to be very effective for preparation of the products with the high functionality including gel characteristics. The same improving effect is also found for use of slightly hydrolyzed blood plasma such as FF&S 500, a product of American Meat Protein Corporation.

It is well known that blood plasma has various high functionalities such as water retention, emulsification, and heat gelation. Bovine and porcine dried blood plasma are used widely in preparation of meat products. A few patents on the application of blood plasma to surimi and and surimi based products were solicited in Japan, such as Japanese patent laid open Sho 58-56661, 58-111661, 59-151865. These patents disclose that the addition of dried blood plasma to the washed fish meat was very effective in improving gel texture of surimi based product made from fish with low functionalities, such as Alaska pollock and sardine. However, the addition of blood plasma to myxosporidian infected fish was not disclosed. Further, according to such patents, the addition of blood plasma at high levels gave dark coloration and unpleasant blood odor to the surimi based products. For example, the addition of more than 0.5%, and more than 2% blood plasma to the surimi was undesirable according to Japanese patents laid open Sho 59-151865 and 58-98061, respectively.

DETAILED DESCRIPTION

In accordance with the present invention the addition of dried blood plasma at the higher level within the range of 0.5 to 4% by weight to the fish meat was found to improve the gel forming capacity of myxosporidian infected fish; then, in order to prepare acceptable frozen surimi and surimi based products from myxosporidian infected fish by the application of dried blood plasma, the problem of dark color and unpleasant blood odor developed by the addition of dried blood plasma was solved.

Specifically, and in accordance with the invention, the addition of dried blood plasma was found to improve significantly the gel forming capacity of frozen surimi and the texture and elasticity of surimi based products derived from myxosporidian infected fish; and also, the addition of edible food oil together with dried blood plasma together prevented a decrease in whiteness, and also significantly reduced the development of blood odor in the surimi and surimi based products.

The fish used may be Pacific whiting, Merluccius products, Peruvian hake, Merluccius gayi, etc., which were infected with myxosporidian parasites. The dried blood plasma employed may be food grade bovine or porcine dried blood plasma, which are used widely in preparation of meat products. Alternatively slightly hydrolyzed blood plasma such as FF&S 500, a product of American Meat Protein Corporation, may be used. The amount of dried blood plasma to be used should be in the range of from 0.3 to 5% by weight of the washed minced fish meat, or frozen surimi, with 0.5 to 4% being preferred.

The oil used may be any food grade oil in liquid state and at room temperature, such as soybean oil, corn oil, etc. Fat in solid form is not desirable, because it is difficult to be mixed into the meat. When food oil is incorporated into surimi or surimi based products in commercial manufacturing processes, it is normally mixed in emulsion form into the meat. In order to prepare emulsion oil, a mixture of food oil, water, and surfactants such as glycerin mono-fatty acid ester or dried protein such as isolated soy protein are treated in a high speed mixer or an emulsifier. As water at least three times in weight of food oil is necessary to prepare emulsion, the water content in the surimi or surimi based products is simultaneously increased, although the moisture content of commercial frozen surimi is usually strictly specified. Besides, preparation of emulsion is troublesome and time-consuming. Therefore, incorporation of food oil in emulsion form is not desirable. In accordance with the present invention, it was found that dried blood plasma and food oil may be very easily incorporated into fish meat without any special treatments such as emulsion preparation during the commercial manufacturing process, and the addition of water typically is unnecessary.

The amount of food oil to be used should be in the range of from 0.3 to 3 times the weight of the dried blood plasma employed, with 0.5 to 2 times being preferred.

Dried blood plasma and food oil may be mixed directly into the washed minced fish meat in a ribbon mixer or a silent cutter apparatus. In the manufacture of surimi based products, food oil and dried blood plasma may be mixed into surimi batter, when washed meat or frozen surimi prepared by the traditional method is ground with salt and other ingredients in a stone mortar or silent cutter device. Dried blood plasma and food oil may be added separately into fish meat during the mixing or grinding step. A mixture of dried blood plasma and food oil prepared previously may be convenient to incorporate in the fish meat, so as to prevent fly out of the dried blood plasma powder during the mixing step.

The following examples are for purposes of illustration and are not intended to be limiting:

EXAMPLE 1

Frozen surimi was prepared from myxosporidian infected Pacific whiting, and the presence of the myxosporidian cysts in the fish muscle was examined as by visual examination. Four filleted fish among forty seven fish were found to be infected by myxosporidian parasites. Minced fish meat was prepared by passing the fillets through a meat separator, washing the meat repeatedly with cold water, and then dewatering the meat. The latter was then mixed with 0.3% by weight sodium polyphosphate and 10% by weight sorbitol, in a silent cutter. At the initial stage of the mixing step, dried bovine blood plasma and soybean oil were added to various levels, as set forth below. The surimi thus obtained was frozen at −40° C. by an air blast freezer, and then stored at −25° C., for four months.

The gel forming capacity of the frozen surimi was then judged by the texture and jelly strength of the cooked gel, prepared from the frozen surimi, in the following manner: the frozen surimi was shredded into small pieces and ground with 3% by weight salt (NaCl) in a small cutter to form meat batter. The meat batter was packed in a polyvinylidene casing and cooked in hot water at 90° C. for 40 minutes. The texture and the color of the cooked gel was determined organoleptically by well experienced panels, and the jelly strength was determined by a penetrometer, specifically a Fudo's Rheometer. The results obtained were as shown in the following table; all percentages being by weight:

| ingredients added to fish meat | color of mix | texture | jelly strength |
|---|---|---|---|
| no addition | white | paste | 0 gm/cm |
| 2% blood plasma + 1% oil | slightly white | elastic gel | 516 gm/cm |
| 2% blood plasma + 2% oil | white | elastic gel | 511 gm/cm |
| 2% blood plasma | dark | elastic gel | 496 gm/cm |

The frozen surimi containing no blood plasma did not produce any elastic cooked gel, but only paste, after being ground with salt (NaCl) and cooked. On the other hand, and as shown by the table, when dried bovine blood plasma was added at 2% level, alone or together with soybean oil, the mix produced elastic cooked gel with high jelly strength. Thus, the dried bovine blood plasma was found to improve significantly the gel forming capacity of the frozen surimi made from infected Pacific whiting.

The color of the cooked gel made from the surimi containing 2% blood plasma alone was dark. On the other hand the addition of soybean oil of 1% and 2%, or a half or the same amount of the dried blood plasma, decreased darkening of the cooked gel color.

EXAMPLE 2

Frozen surimi was prepared from myxosporidian infected Pacific whiting by the traditional method, and Kamaboko, in casing. A variety of surimi based products, was prepared from the frozen surimi.

Eleven Pacific whiting including four fish infected by myxosporidian parasites were iced for one day, headed and gutted, and then passed through a meat separator. The resulting minced fish meat was repeatedly washed with cold water, i.e. five times, and then dewatered. The washed meat was mixed with 0.3% sodium polyphosphate, 4% sugar and 4% sorbitol in a ribbon mixer, and then frozen at −40° C. The percentages were by weight. After storage at −25° C. for 3 months, the frozen surimi was ground in a silent cutter with 3% salt (NaCl), 0.3% monosodium glutamate, and 3% normal dried bovine blood plasma, FF&S 500, a product of American Meat Protein Corporation, together with corn salad oil at various levels as set forth below. If desired, slightly hydrolyzed dried bovine blood plasma can be used. The meat paste was then packed in polyvinylidene casings and cooked to form gel, in water at 40° C. for 60 minutes and then at 90° C. for 25 minutes. The texture and odor of the resultant cooked Kamaboko were judged organoleptically. The Hunter's whiteness and jelly strength of the Kamaboko were determined by use of a Nippon Densi Kogyou Color Meter and a Fudo's Rheometer, respectively.

The results obtained were shown in the following table:

| ingredients added to fish meat | texture of mix | blood odor | Hunter whiteness | jelly strength (g/cm) |
|---|---|---|---|---|
| no addition | paste | no | 45.3 | 0 |
| 3% hy.b.b.p.* | elastic gel | strong | 38.9 | 991 |
| 3% hy.b.b.p. + 3% oil | elastic gel | slight | 44.5 | 985 |
| 3% hy.b.b.p. + 15% oil | soft gel | slight | 47.3 | 450 |
| 3% b.b.p.** + 6% oil | elastic gel | slight | 44.9 | 1010 |

*slightly hydrolyzed bovine blood plasma
**bovine blood plasma

As indicated, when dried bovine blood plasma preparations were not added, elasticity of the infected Pacific whiting frozen surimi was not obtained. Only very mushy gel or paste was obtained.

When 3% dried bovine blood plasma preparations were incorporated into the infected Pacific whiting surimi during the grinding step, elastic Kamabokos with high jelly strength were obtained. No differences in the texture and jelly strength were found as between the Kamaboko to which slightly hydrolyzed blood plasma preparation was added, and the Kamaboko to which the normal blood plasma preparation was added.

The Kamaboko containing only blood plasma was dark, and had a distinct blood odor. On the other hand, Kamabokos with high Hunter whiteness and jelly strength were obtained by the addition of corn salad oil at 3 or 6%, together with 3% blood plasma preparations. Blood odor was noticed only slightly in the Kamabokos containing oil and blood plasma. Addition of 6% oil, five times in weight of the blood plasma resulted in a very white Kamaboko; however, its texture was very soft and porous, and its jelly strength was low. Incorporation of too much oil may therefore be undesirable.

EXAMPLE 3

A typical and traditional Japanese surimi based product, was prepared on a wood board from frozen fillets of myxosporidian infected Peruvian hake, according to the present invention, in the following manner:

Among thirty frozen fillets of Peruvian hake used; six fillets were found to be infected with myxosporidian parasites. All the fillets were minced by use of a meat chopper, washed three times with chilled water, and then dewatered. The dewatered meat was ground in a stone mortar with 2.5% salt, 0.3% monosodium glutamate, 5% potato starch, and a mixture of 3% pork blood plasma and 4.5% soybean oil. The surimi batter thus obtained was placed on a wood plate and cooked in a steam containing box at 90° C. for 30 minutes. A control Kamaboko was prepared in the same way except that 5% potato starch was employed instead of the mixture of pork blood plasma and oil. Texture, odor, and color of both Kamabokos were compared organoleptically and their jelly strength was determined by Fudo's Rheometer.

The results obtained were shown in the following table.

| ingredient added to fish meat | color | blood odor | texture | jelly strength |
|---|---|---|---|---|
| blood plasma plus starch (first Kamaboko) | white | slight | elastic gel | 653 g/cm |
| starch (control Kamaboko) | white | none | slightly elastic gel | 150 g/cm |

As the Kamaboko prepared by the present invention was white and elastic, it was salable. On the contrary, the control Kamaboko containing starch had too low elasticity to be placed on sale.

The process according to the invention, of preparing frozen surimi and surimi based products, exhibiting gel characteristics, from whiting, hake, or similar ocean fish meat, at least some of which is infected with myxosporidian parasite, includes the steps:

(a) mincing and washing the fish meat, (b) combining and mixing the washed minced meat with between about 0.3% and 5% by weight blood plasma and between 0.3 and 15% by weight edible oil to form a mix, (c) combining with the mix between about 1% and 5% by weight of salt to solubilize the fish meat proteins, (d) also combining with the mix at least one of the following: seasoning, flavorant, colorant, aroma, starch, and dried edible protein, to form surimi batter, and (e) heat setting the surimi batter for 1 to 90 minutes at between 30° and 130° C. to denature the fish meat proteins.

Further steps include quick freezing the mix prior to step (c), and thawing the frozen mix to enable said step (c); and combining with the mix between 0.1% and 0.5% by weight of substance selected from the group consisting of sorbitol and sugar. Such quick freezing is typically carried out to lower the temperature of the mix to at least as low as about −20° C., and then storing the frozen mix at temperature less than about −20° C.

The steps are indicated in the following processing diagram:

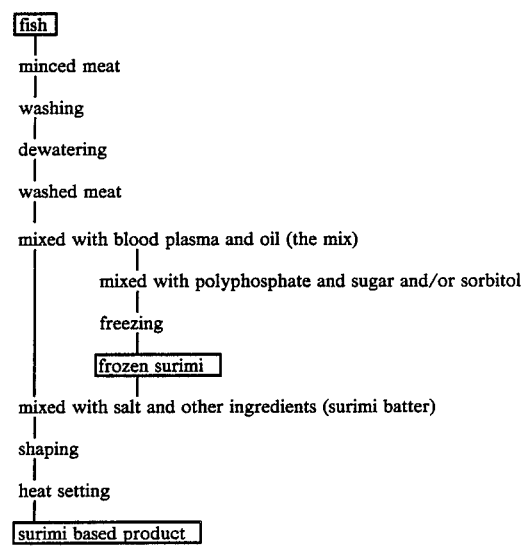

Blood plasma is selected from the group that includes dried bovine blood plasma, dried pork blood plasma, dried hydrolized bovine plasma, and dried hydrolized pork plasma.

Also, edible oil in liquid form is selected from the group that includes corn oil, soybean oil, rape seed oil, cotton seed oil, peanut oil, sunflower oil, safflower oil, and rice bran oil; and heat setting of the surimi batter comprises one of the following: steaming, broiling, deep fat frying, and soaking in hot water.

Further, the polyphosphate is selected from the group that includes sodium pyrophosphate, sodium tripolyphosphate, and sodium hexametaphosphate.

We claim:

1. In the method of preparing surimi and surimi based products, exhibiting gel characteristics, from meat of ocean fish infected with myxosporidian parasite, the steps comprising (a) mincing and washing the fish meat, (b) combining and mixing the washed and minced meat with between about 0.3% and 5% by weight blood plasma and between 0.3 and 15% by weight edible oil to form a mix, the weight ratio of edible oil to blood plasma being in the range of about 0.5 to 2, and to decrease darkening of the fish meat in the mix, without inhibiting gel strength and texture, (c) combining with the mix between about 1% and 5% by weight of salt to solubilize fish meat proteins in said mix, (d) combining with the salt containing mix at least one of the following: seasoning, flavorant, colorant, aroma, starch, and dried edible protein, to form surimi batter, and then (e) heat setting the surimi batter for 1 to 90 minutes at between 30° and 130° C. to denature the fish meat proteins.

2. The method of claim 1 including quick freezing the mix prior to step (c), and thawing the frozen mix to enable said step (c) to be performed.

3. The method of claim 2 including, after said step (a), combining with the mix between 0.1% and 0.5% by weight of polyphosphate, and between about 4% and 12% by weight of a substance selected from the group consisting of sorbitol and sugar.

4. The method of claim 3 wherein said polyphosphate is selected from the group consisting of sodium pyrophosphate, sodium tripolyphosphate, and sodium hexametaphosphate.

5. The method of claim 2 wherein said quick freezing lowers the temperature of the mix to at least as low as about −20° C., and then the frozen mix is stored at a temperature less than about −20° C.

6. The method of claim 1 wherein said blood plasma is selected from the group consisting of
   dried bovine blood plasma
   dried pork blood plasma
   dried hydrolized bovine plasma
   dried hydrolized pork plasma.

7. The method of claim 1 wherein said edible oil is in liquid form and is selected from the group consisting of corn oil, soybean oil, rape seed oil, cotton seed oil, peanut oil, sunflower oil, safflower oil, and rice bran oil.

8. The method of claim 1 wherein said heat setting of the surimi batter occurs by one of the following: steaming, broiling, deep fat frying, and soaking in hot water.

9. The method of claim 1 wherein 0.5 to 4% by weight dried blood plasma is used.

10. The product produced by the process of claim 1.

* * * * *